United States Patent [19]

Unnikrishnan et al.

[11] Patent Number: 4,775,038

[45] Date of Patent: Oct. 4, 1988

[54] SPRING LOADED PISTON SEAL AND VALVING COMPONENT FOR SHOCK ABSORBERS, MACPHERSON STRUTS AND THE LIKE

[75] Inventors: K. V. Unnikrishnan, Pulaski, Tenn.; Charles Goldstein, Aurora; Raymond R. Loikets, West Chicago, both of Ill.

[73] Assignee: Maremont Corporation, Carol Stream, Ill.

[21] Appl. No.: 947,704

[22] Filed: Oct. 30, 1986

[51] Int. Cl.[4] .......................... F16F 5/00; F16F 9/00; F16F 9/34; F16F 9/18

[52] U.S. Cl. .................................. 188/320; 188/317; 188/322.15

[58] Field of Search ........... 188/297, 316, 317, 322.15, 188/320; 267/126, 127; 137/493.8, 513.5

[56] References Cited

U.S. PATENT DOCUMENTS

| | | |
|---|---|---|
| 2,487,471 | 11/1949 | Patriquin . |
| 2,507,267 | 5/1950 | Patriquin ............................ 188/320 |
| 2,760,604 | 8/1956 | Wyeth . |
| 2,788,092 | 4/1957 | Whisler . |
| 2,912,069 | 11/1959 | Dillenburger . |
| 3,085,661 | 4/1963 | Takagi . |
| 3,747,714 | 7/1973 | DeCarbon . |
| 3,828,897 | 8/1974 | Nandyal . |
| 3,884,483 | 5/1975 | Fengler . |
| 4,280,601 | 7/1981 | Patriquin . |
| 4,352,417 | 10/1982 | Stinson ............................ 188/322.15 |
| 4,428,567 | 1/1984 | Fournales . |
| 4,467,899 | 8/1984 | Molders et al. ................. 188/327.15 |

FOREIGN PATENT DOCUMENTS 2075152 11/1981 United Kingdom ........... 188/322.15

Primary Examiner—Andres Kashnikow
Assistant Examiner—Richard Potosnak
Attorney, Agent, or Firm—Allegretti & Witcoff

[57] ABSTRACT

A piston valving and seal mechanism is for a fluid shock absorbing device. A piston is mountable on a piston rod of the device. The piston has an outer periphery, rebound chamber face and compression chamber face. A piston seal is movably mounted in a groove where the piston rebound chamber face and outer periphery meet. The seal is adjacent compression passages in the outer periphery. A seal retainer plate along the piston rebound chamber face with a backing spring bias the seal. The plate is raised from the rebound chamber face and includes passages through the plate for fluid flow through the plate and into underlying recoil passages in the piston. The seal acts as a check valve for the compression passages. A separate recoil passage valve plate on the compression chamber face, with a backing spring, acts as a valve for the recoil passages.

3 Claims, 3 Drawing Sheets

SPRING LOADED PISTON SEAL AND VALVING COMPONENT FOR SHOCK ABSORBERS, MACPHERSON STRUTS AND THE LIKE

BACKGROUND AND SUMMARY OF THE INVENTION

The present invention relates to hydraulic shock absorbers of the direct double acting tubular type, and more particularly to an improved piston valving and seal mechanism for this type of shock absorber.

Direct double acting tubular shock absorbers utilized on automotive vehicles having spring-suspended frames usually comprise a cylinder attached to the axle of the vehicle and a piston in the cylinder which is connected with the frame so that when the wheels of the vehicle pass over an uneven surface the piston and cylinder move relative to one another. The cylinder contains a suitable damping fluid which is expelled from one end of the cylinder into a reservoir when the axle and frame move toward one another, relatively. This action is referred to as the compression stroke of the shock absorber. In many instances the valving within the shock absorber is designed to restrict the flow of fluid from the cylinder during the compression stroke and thus restrain the motion of the vehicle. When the cylinder and piston move in the opposite direction, the motion is referred to as recoil. On recoil, it is desirable to cause the damping fluid to freely re-enter the cylinder so that the tendency of the piston to create a vacuum in the cylinder is obviated by the relatively free entrance of fluid into the cylinder.

The present invention is more particularly directed to an improved piston valving and seal assembly of the type which is adapted to control the flow of hydraulic fluid across the piston to and from the compression space of the unit to and from the recoil space of the unit around the periphery of, and through the piston. The improved piston valving and seal mechanism of the present invention importantly provides a new piston seal and valve combination in which the piston seal acts as a check valve preventing fluid from flowing from the rebound chamber through fluted compression passages on the outer periphery of the piston, during the recoil stroke. During recoil the fluid must flow through recoil passages and out into the compression chamber. The recoil valve seat with an orifice impressed therein provides control at low piston velocities. At higher piston velocities, the increase in the differential hydraulic pressure acting on the valve face moves the rebound valve off the seat to accommodate increased fluid flow to the compression chamber.

During the compression stroke, a small portion of fluid flows from the compression chamber through the path created by the recoil orifice through the restriction passage and into the rebound chamber. However, the major portion of the fluid flows from the compression chamber through the fluted compression passages. Again, the differential pressure that exists between the compression chamber and the rebound chamber will tend to lift the piston seal from a seal seat, permitting shock absorber fluid to flow up the fluted passages and into the rebound chamber. A spring biases the piston seal toward its seated position by acting on the seal through a seal retainer.

Accordingly it is an object of the present invention to provide a shock absorber having an improved piston valving and seal assembly of the type described.

Another object of the present invention is to provide a shock absorber having an improved piston valving and seal assembly which is simple in construction, economical to manufacture and effective in operation.

These and other objects of the present invention will become more apparent during the course of the following detailed description and appended claims.

The invention may best be understood with reference to the accompanying drawings, wherein an illustrative embodiment is shown.

BRIEF DESCRIPTION OF THE DRAWING

The accompanying drawing includes four figures. These figures are as follows.

DETAILED DESCRIPTION OF THE PREFERRED EMBODIMENT

Figure 1:
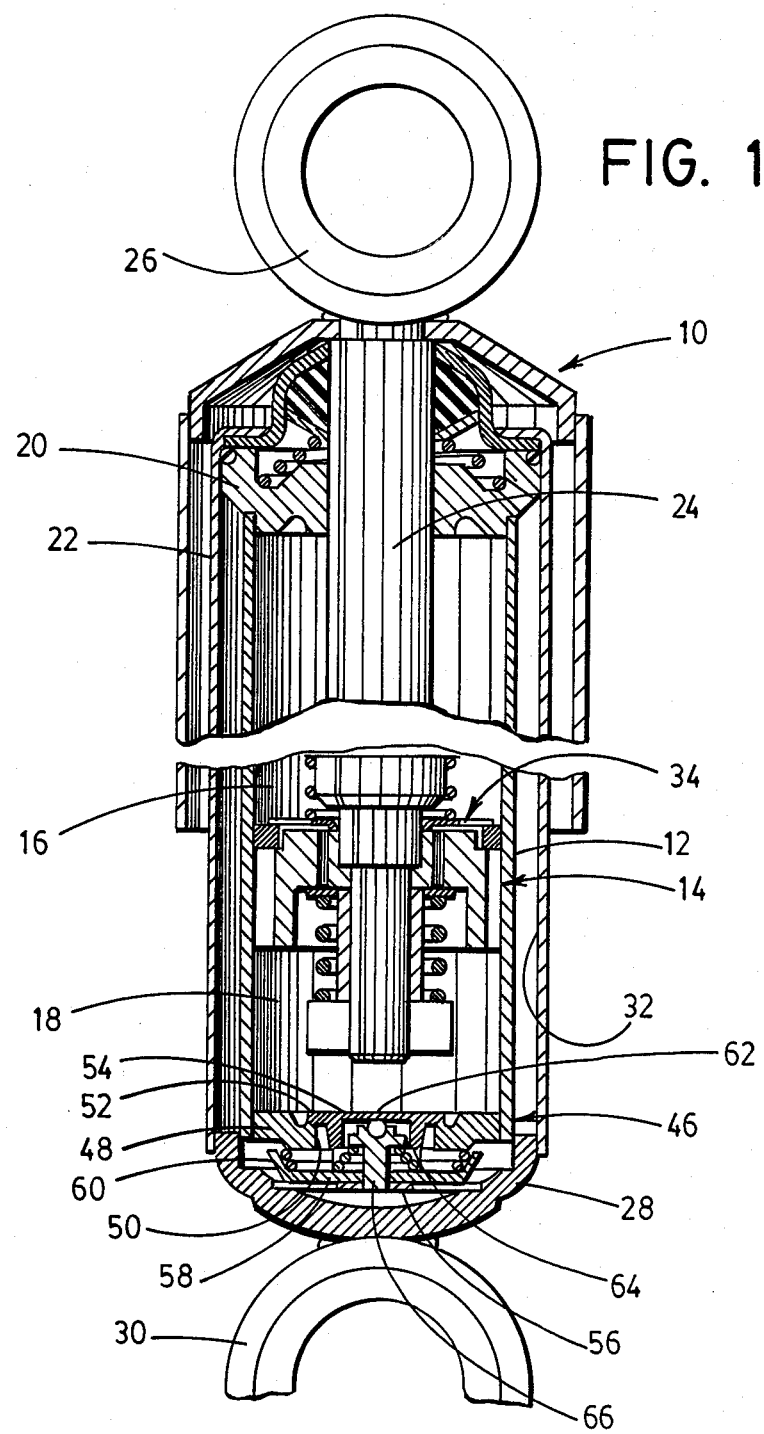
FIG. 1 is a vertical sectional view of a shock absorber embodying the principles of the present invention.

Referring now more particularly to FIG. 1 of the drawing, there is shown therein a direct action hydraulic shock absorber, generally indicated at 10, adapted to be connected between the sprung and unsprung masses of a vehicle, which embodies the principles of the present invention.

In general, it can be stated that the unit 10 is constructed in the manner set forth in U.S. Pat. No. 2,507,267. The disclosure of this patent is hereby incorporated by reference into the present specification. For present purposes it is sufficient to note that the shock absorber 10 includes an inner tubular member 12, which defines a cylindrical chamber within which is slidably mounted a piston 14. The piston 14 divides the cylindrical chamber into an upper rebound or recoil chamber 16 and a lower compression chamber 18. The upper end of the tubular member 12 has an end closure assembly 20 fixed thereto, which end closure assembly also receives the upper end of an outer tubular member 22.

The end closure assembly 20 serves to slidably sealingly engage the exterior periphery of a piston rod 24 which extends into the rebound space 16 and is suitably connected with the piston assembly 14. The outer end of the piston rod has an appropriate connector 26 fixed thereon which serves to connect the shock absorber 10 to the sprung mass of the vehicle. The lower end of the outer tubular member 22 has an end cap or closure 28 fixed thereto which, in turn, has a connector 30 fixed to the central exterior thereof for connecting the lower end of the shock absorber 10 with the unsprung mass of the vehicle.

It will be understood that the rebound and compression spaces 16 and 18 are filled with hydraulic fluid, which hydraulic fluid also partially fills a replenishing space 32 formed between the exterior of the inner tubular member 12 and the outer tubular member 22. In order to control the flow of hydraulic fluid from the compression space 18 into the rebound space 16 during the compression movement of the shock absorber 10, there is provided in the piston 14 an improved spring pressed piston valving and seal mechanism, generally indicated at 34, embodying the principles of the present invention hereinafter to be more fully described.

In order to accommodate the piston rod displacement during the telescopic movements of the unit, there is provided a base assembly, generally indicated at 46, which is positioned adjacent the lower end closure 28. The base assembly 46 includes a combined compression and replenishing valve which is constructed generally in accordance with the disclosure contained in U.S. Pat. No. 4,109,767, the disclosure of which is hereby incorporated by reference into the present specification. For present purposes it is sufficient to note that the base assembly 46 includes a base member 48 which is fixedly connected with the lower end of the inner tubular member 12 and the interior of the end closure 28. The periphery of the base member 48 provides passages between the replenishing space 32 and the space between the base member 48 and the end closure 28. Formed in the central portion of the member 48 is a central opening 50 having an upwardly facing valve seat 52 surrounding the upper end thereof. A replenishing valve member 54 is mounted within the opening 50 so that its outer marginal portion is disposed in engagement with the valve seat 52. The replenishing valve member 54 includes depending arms 56 which extend through a spring retainer 58 for movement together with the valve member. A spring 60 is operatively arranged between the base member 48 and spring retainer 58 so as to resiliently urge the retainer 58 downwardly and hence the valve member 54 into engagement with the seat 52. Valve member 54 includes a central opening 62 which is adapted to cooperate with a ball compression valve member 64 slidably mounted within the central portion of the spring retainer 58. Valve 64 is resiliently urged upwardly by a spring 66 having its upper end engaged with the valve and its lower end seated on the spring retainer 58.

Figure 2:
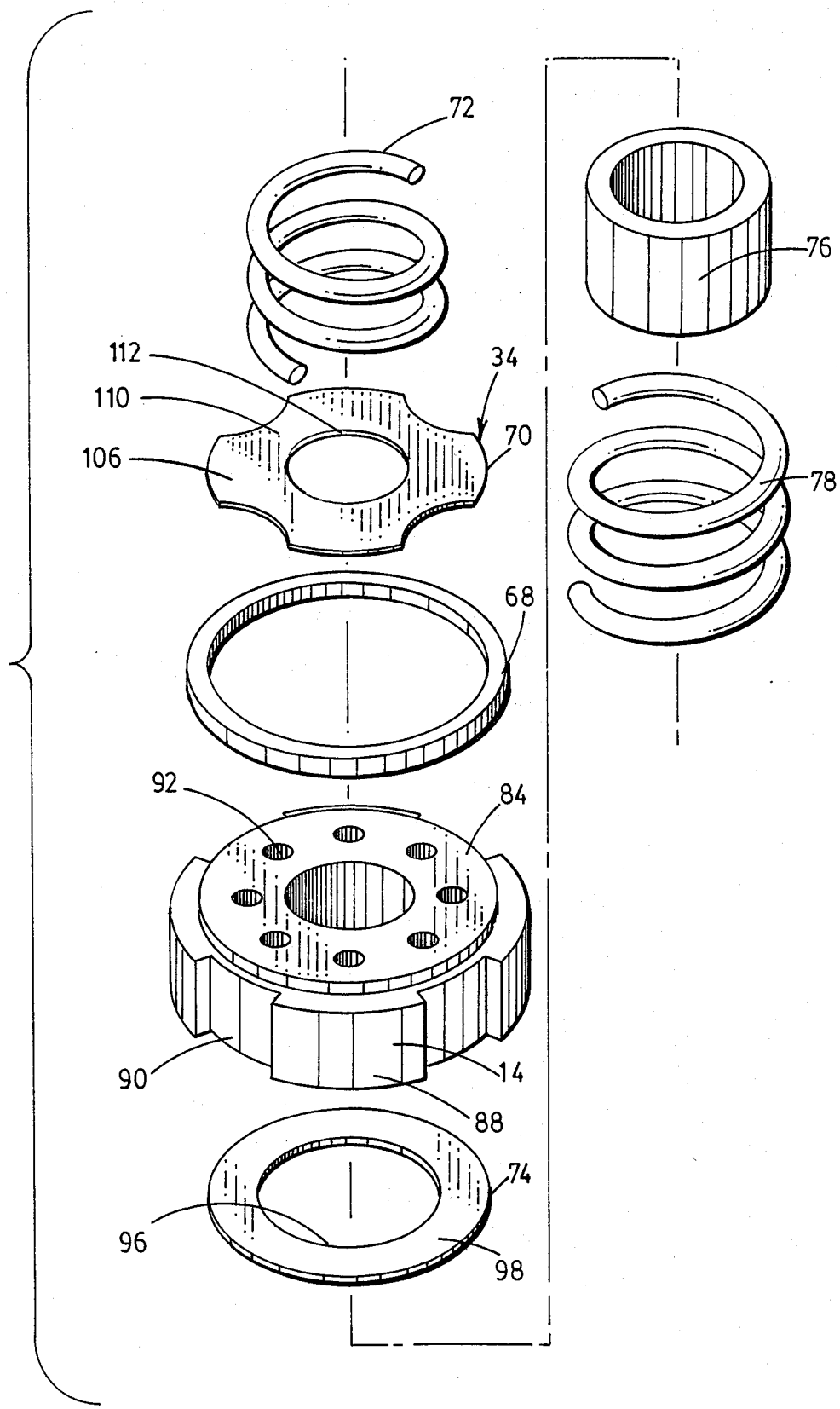
FIG. 2 is an exploded view of the component parts of the piston compression valve mechanism and piston.
Figure 3:
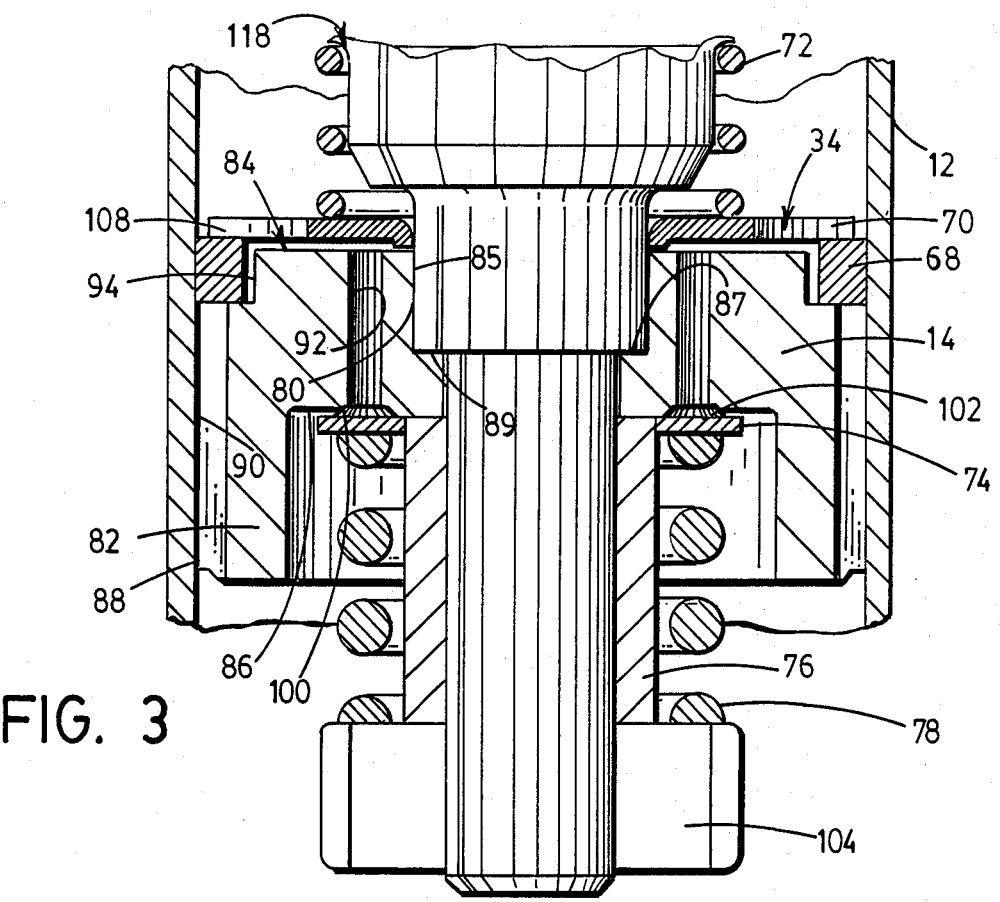
FIG. 3 is an enlarged fragmentary section view illustrating the position of the parts of the piston compression valve mechanism of the present invention during an initial compressive movement.
Figure 4:
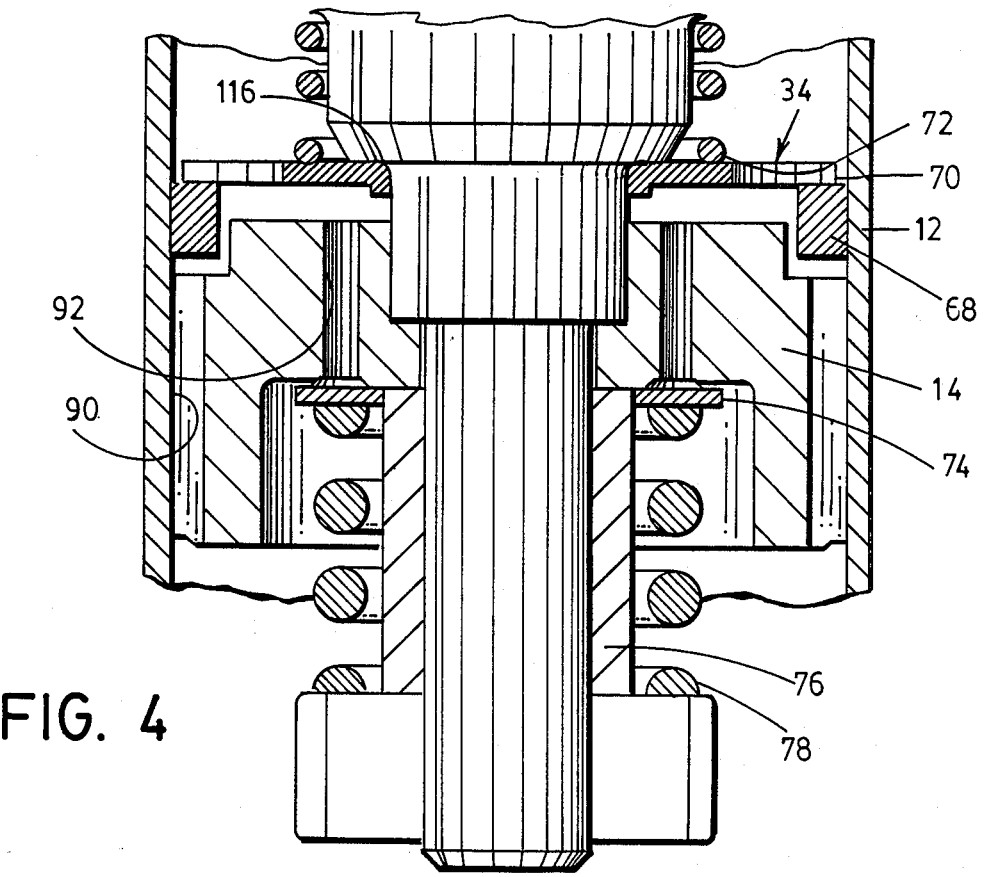
FIG. 4 is a view similar to FIG. 3 showing the parts moved into their limiting position during a subsequent compressive movement.

Referring now more particularly to FIGS. 2–4, the details of construction of the improved piston valving and seal mechanism 34 embodying the principles of the present invention are shown therein. As in FIG. 2, the mechanism 34 comprises structure of the piston 14, a piston seal 68, a seal retainer plate 70, a retainer backing spring 72, a valve plate 74, a spring column 76 and a valve backing spring 78.

Referring to FIG. 3, the piston 14 includes an annular central body portion 80 and an annular sidewall portion 82. The central body portion 80 includes an upper rebound chamber face 84, as in FIG. 2, and a portion of a lower compression chamber face 86, as in FIG. 3. A central opening 85 and a ledge 87 therein position the piston 14 in fixed position against a cooperating ledge 89 along the piston rod 12.

The sidewall portion 82 depends from the outer margin of the central body portion 80 and defines the cylindrical sidewall 88, FIG. 2, which is the outer periphery of the piston 24. The sidewall portion 82 completes the compression chamber face 86.

Two types of passages are defined in the piston 14. The sidewall 88 is cast to be fluted to provide plural compression passages such as 90, FIG. 2, along the outer periphery of the piston 14. The central body portion 80 is cast or machines to provide at least one restriction passage such as 92 through the piston 14. Both the compression and recoil passages extend between the two piston faces 84 and 86.

Valving is provided for both sets of passages such as 90, 92. Seal 68 acts as a check valve for the compression passages. Valve 74 acts as a check valve for the recoil passages 92.

The seal 68 is annular, substantially rectangular in cross-section, and sized with an outer diameter substantially equal to the inner diameter of the inner tubular member 12. The seal 68 seals against fluid flow between the seal 68 and the member 12. The seal is slidable within the member 12, and rests in a groove 94 in the piston 14 where the outer periphery and rebound chamber face meet. The seal overlies the compression passages. The seal does not overlie the recoil passages.

The valve 74 is an annular plate. The valve 74 defines a central opening 96, FIG. 2, which is fitted about the column 76. The valve 74 is thereby slidably mounted on the column 76.

A planar surface 98, FIG. 2 of the valve 74, presents itself to the recoil passages. The surface 98 overlies the passages. The surface 98 at least partially, and indeed, substantially closes the restriction passages when it rests on raised valve seats such as seat 100, FIG. 3, which encircle the passages such as 92. An orifice such as 102 is undercut into the valve seat such as 100, to provide control at low piston velocities, as will be described.

The valve 74 is biased and pressed against the valve seats such as 100 by the spring 78. The spring 78, which is helical, abuts the valve 74 and a nut 104 on the rod 12. The spring constant is such that relative small pressure differentials across the piston 14 during the recoil stroke of the piston 14 do not overcome the spring 78 or lift the valve 74 from the seats 100. Relatively large pressure differentials do overcome the spring 78 and do lift the valve 74 from the seats 100. During the compression stroke, pressure differentials across the piston do not act on the spring 78; valve 74 remains on the seats 100.

The seal retainer 70 presses against the seal 68 under the force of the spring 72. Spokes such as 106, FIG. 2, of the retainer 70 extend radially outward of the retainer 70, and define interposed spring retainer passages such as 108, FIG. 3. A solid intermediate portion 110, FIG. 2, of the retainer 70 surrounds a central opening 112, FIG. 2, at the retainer 70, interposing the spokes 106 and opening 112. The portion 110 is contacted by the spring 72.

The spring 72 also contacts a step 118, FIG. 3, on the piston rod 24. The spring 72 biases the retainer 70 against the seal 68. The spring 72 also biases a turned flange 116, FIG. 4, of the retainer 70 toward the piston rebound chamber face. The flange 116 and thereby the retainer 70 is slidable along the piston rod 24.

The flange 116 prevents the retainer 70 from contacting the piston rebound chamber face adjacent the recoil passages. A path for fluid passage is thereby always present between the recoil passages and rebound chamber. This path extends between the piston and retainer 70, and through the retainer passages such as 108.

The spring 72 has a spring constant such that pressure differentials across the piston during the compression stroke of the piston overcome the spring 72 and lift the seal 68 from the groove 94, as in FIG. 4. Fluid flows from the compression chamber through the compression passages past the seal and through the retainer 70. Fluid also flows in lesser amounts through the orifices such as 102, and recoil passages 92.

The preferred embodiment and the invention are now described in such full, clear, concise and exact terms as to enable a person of skill in the art to make and use the same. To particularly point out and distinctly claim the subject matter regarded as invention, the following claims conclude this specification.

What is claimed is:

1. A piston valving and seal mechanism for a fluid shock absorbing device having an inner tubular member with an inner diameter, a rebound chamber and a compression chamber, and a piston rod comprising:

the piston rod having a step and a spring column, a piston mountable on a piston rod, the piston having an annular central body portion and an annular sidewall portion, the central body portion including an upper rebound chamber face, a portion of a lower compression chamber face and an outer margin, the annular sidewall portion depending from the outer margin of the annular central body portion and defining the cylindrical sidewall which is an outer periphery of the piston, the cylindrical sidewall being fluted to form flutes, the annular sidewall portion completing the compression chamber face, a plurality of compression passages provided by the flutes along the outer periphery of the piston extending from the rebound chamber face to the compression chamber face, and a plurality of recoil passages in the central body portion of the piston extending from the rebound chamber face to the compression chamber face, the piston further defining a groove where the outer periphery and rebound chamber face meet, a piston seal means mounted on the piston rebound chamber face for releasably overlying the compression passages and not the recoil passages, the seal means being a seal which is annular, substantially rectangular in cross-section and sized with an outer diameter substantially equal to the inner diameter of the inner tubular member, which seals against fluid flow between the seal and the inner member, is slidable within the member, overlies the periphery only of the piston rebound chamber face, and rests in the groove in the piston where the outer periphery and rebound chamber meet, a seal retainer pressing against the seal of the piston seal means, the seal retainer including a solid intermediate portion surrounding a central opening and spokes extending radially outward of the seal retainer and defining interposed spring retainer passages, the intermediate portion interposing the spokes and the central opening, the seal retainer also including a turned flange along the central opening, the flange preventing the seal retainer intermediate portion from contacting the piston reboud chamber face adjacent the recoil passages for providing a path for fluid passage between the recoil passages and the rebound chamber, the seal retainer being mounted for movement along the piston rod adjacent the piston rebound chamber face and against the annular piston seal, seal biasing means mounted for biasing the piston seal for releasably closing the compression passages, the seal biasing means being a spring contacting the step on the piston rod and the intermediate portion of the seal retainer, the seal biasing means also biasing the seal retainer against the seal and the turned flange of the seal retainer toward the rebound chamber face of the piston;

valve means for releasably overlying the recoil passages and not the compression passages along the compression chamber face of the piston, the valve means being an annular plate defining a central opening which is fitted about the spring column of the piston rod, the annular plate thereby being slidably mounted on the column, the annular plate including a planar surface which presents itself to the recoil passages and overlies the passages; and valve biasing means mounted on the piston rod and valve biasing means for biasing the valve means for releasably and at least partially closing the recoil passages, the valve biasing means being a helical spring which abuts the annular plate of the valve means;

and a fastener on the column, the helical spring of the valve biasing mans abutting the fastener on the column.

2. A piston valving and seal mechanism as in claim 1 in which the piston includes a valve seat adjacent each recoil passage on the piston compression chamber face, the valve means resting on the valve seat, the valve seat including an undercut compression stroke flow enhancing orifice into the restriction passage.

3. A piston valving and seal mechanism as in claim 1 in which the piston includes a valve seat adjacent each recoil passage on the piston compression chamber face, the valve seat including an undercut low piston velocity recoil flow modifying orifice

* * * * *